Figures 1, 2:
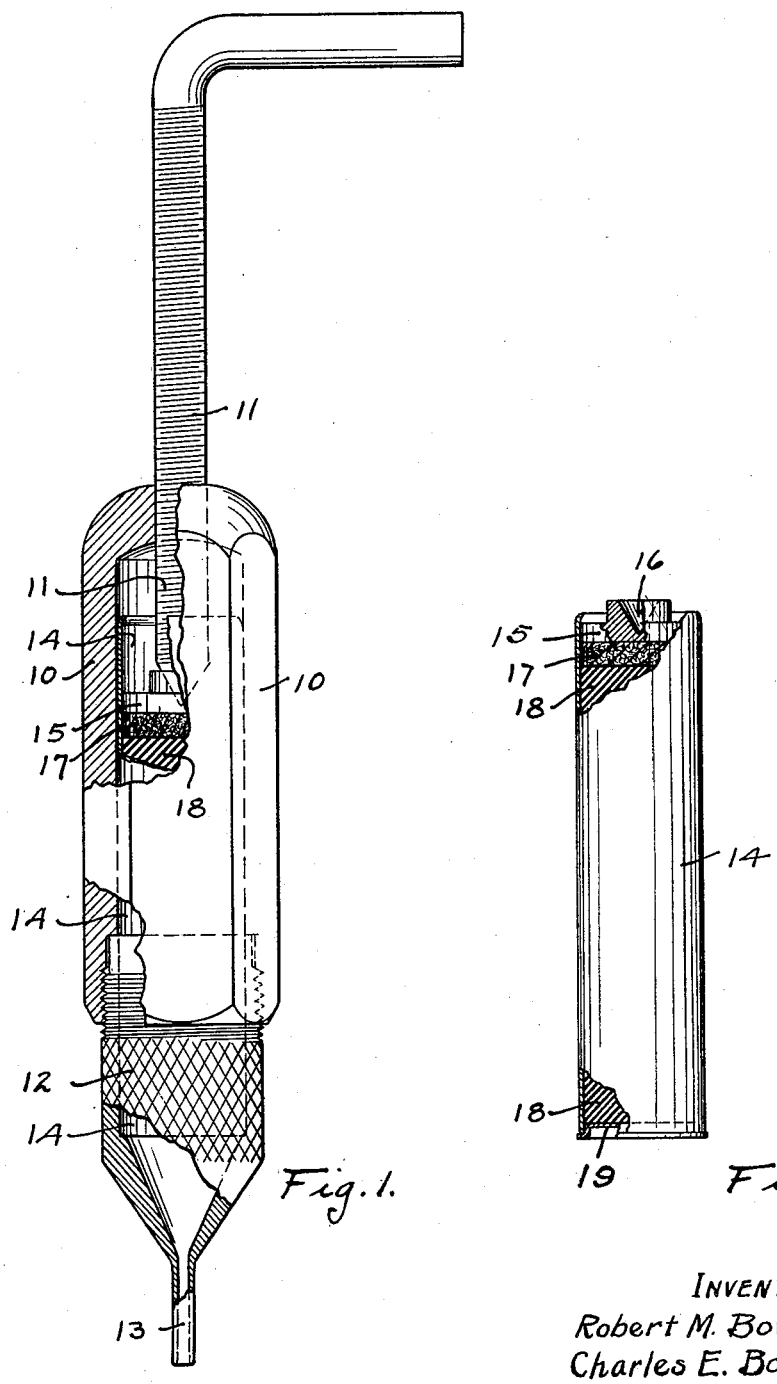

April 18, 1933.   R. M. BOWES ET AL   1,904,403
METHOD AND MEANS FOR FILLING TIRE CASING CUTS
Filed Aug. 19, 1931

INVENTORS,
Robert M. Bowes, and
Charles E. Bowes,
By Minturn & Minturn,
Attorneys.

Patented Apr. 18, 1933

1,904,403

UNITED STATES PATENT OFFICE

ROBERT M. BOWES AND CHARLES E. BOWES, OF INDIANAPOLIS, INDIANA

METHOD AND MEANS FOR FILLING TIRE CASING CUTS

Application filed August 19, 1931. Serial No. 558,180.

This invention relates primarily to means for handling and filling cuts in casings of automobile tires and the like. Casings rarely ever wear out completely from road friction but usually suffer cuts from glass or nails which permit sand, dirt and moisture to enter through the outer rubber surface to come into contact with the fabric or cords thereunder. This fabric or cord material, made of cotton, soon rots and becomes abraded under the action of the sand and dirt with the usual result of a break. To prevent this undue disintegration of casings arising from such cuts, a material was developed comprising unvulcanized rubber with vulcanizing agents added thereto to cause the rubber to cure out or vulcanize when exposed to air.

This material, commercially known as tire dough, was so elastic that it could not be punched into the casing cuts, and even when a ball of it was forced into a cut, it did not adhere to the walls or sides of the cut for the reason that it could not be placed within the cut with sufficient pressure to completely fill the cords out of which the fabric is woven and line the cavity and then as the casing was rolled over the road under the weight of the car, the ball of tire dough in the cavity would be shifted around from side to side and finally protrude from the cavity to stick to the roadway and be pulled out. Not only was it practically impossible to get any sizeable amount of the tire dough into the cords of a cut and keep it there, but the dough had to be in some container from which it could be dug or cut out when wanted for use. In such containers, it was regularly exposed to the air and it soon became cured and useless and the manufacture of the tire dough had heretofore practically stopped.

The tire dough is the same material as is found on the underside of the common tire patch, only but slightly more plastic. Its elasticity is great and so is its toughness or tenacity in resisting being cut or pulled apart.

Our invention embodies the conception of and has for objects the subjecting of the tire dough to sufficient pressure to cause it to flow and to interject the flowing tire dough under sufficient pressure to within the casing cut and cavity thereunder to cause the flowing tire dough to spread out within the cut and press against the cords at the bottom and sides with considerable force so as to bring the tire dough into intimate contact under yielding pressure to cause the tire dough to become integrally united with the cords upon vulcanizing thereto. When the tire dough is subjected to sufficient pressure it becomes sticky or adhesive over its contracting surface so that it adheres to the sides of the cut.

A further object of the invention is to provide means for holding the tire dough heavy lubricants and other stiff, viscid liquids which are almost solids in shipment and for use in the absence of air and for permitting the application of pressure to the tire dough without having to transfer it from one container to another or otherwise expose it to the air.

These and other objects will become apparent in the following description of the invention with reference being made to the accompanying drawing, in which Fig. 1 is a fragmentary side elevation of a gun embodying the invention; and Fig. 2, a fragmentary elevation of a tire dough filler cartridge.

Like characters of reference indicate like parts in the two views in the drawing.

We form a gun to have a barrel 10 with a smooth cylindrical internal bore and screw-threadedly enter a shaft 11 axially through a closed end of the barrel, the other end of which is open. The end of the shaft 11 within the barrel is conically shaped and the outer end is turned to form a handle or crank by which the shaft may be revolved.

A cap 12 is formed to screw-threadedly engage the lower open end of the barrel 10 and has a short length of a bore therein as a continuation of the bore of the barrel. The lower end of the cap 12 is drawn out into a hollow tube or nozzle 13 of relatively small diameter which is in communication with the bore in the cap.

We form a filler unit or cartridge 14, cylindrical in shape to have an external diameter permitting it to be inserted within the bore of the barrel and cap with a close sliding fit. A plug 15 is fitted within the cartridge and moved to one end thereof and prevented from slipping out by having the cartridge wall rolled inwardly somewhat. The outer side of the plug is provided with a conical seat 16 of substantially the same conformation as that of the inner end of the shaft 11. Against the plug 15 from the inner side is placed a wad of felt 17 or other suitable material slightly compressible in nature.

Tire dough 18 or other material to be injected by the gun is placed within the cartridge from the open end and forced lightly against the wad and plug and a friction retained cap 19 is pushed into the open end to cover over the tire dough and seal it from the air. These cartridges 14 containing the desired material are supplied the user who removes the cap 19 and places the open end of the cartridge into the cap 12 and inserts the other end in the bore of the barrel 10. The cap 12 is then screwed onto the barrel 10 and the shaft 11 is revolved to bring its pointed end down into the seat 16 of the plug 15.

The pitch of the threads on the shaft 11 is very small so that by continuing to revolve the shaft, the plug 15 is moved down against the solid tire dough in the cartridge to apply considerable pressure thereto. In fact, the pressure becomes so great that the tire dough is caused to flow from the open cartridge end through the cap nozzle 18 to exude therefrom in a solid stream. The nozzle 18 is forced into a cut of the casing (not shown) and worked around therein to spread the walls of the cut while the tire dough is flowing from its end to have the entire cavity within the cut filled and expanded by the extruding tire dough entered therein under pressure. The tire dough thus coming into contact under pressure with the rubber of the sides of the cut adheres thereto and soon becomes cured or vulcanized thereto. There being a greater adhesive surface within the cut of the tire dough thus entered, the surface of the dough presented at the outer end of the cut when the nozzle 18 is withdrawn is not sufficient to adhere to contacting surfaces and withdraw the dough. Moreover, short exposure to the air soon removes any stickiness of the exposed surface.

When the contents of the cartridge 14 has been forced out of it, the cap 12 may be unscrewed and the empty cartridge withdrawn and thrown away. The use of the cartridge has kept the contents from coming into contact with the bore of the barrel 10 and also that of the cap 12, and a clean bore is presented to receive the next cartridge. The conical point on the shaft end seats in the plug 15 so as to carry it through the cartridge without its turning or "cocking" therewithin, and should the gun be attempted to be used for other purposes by filling the bore of the barrel directly, the pointed end of the shaft would be ineffective in forcing out substances therefrom, so that use of the cartridge is enforced and a clean bore is preserved thereby. Since the cartridge has its upper end within the barrel and its open or discharging end within the cap, a length of the cartridge always extends from either the cap or the barrel when the cap is removed so that the cartridge may be grasped and pulled out from either member as the case may be.

While we have here described and shown our invention in the form as now best known to us, it is obvious that structural changes may be made in the gun and the filler cartridge and its contents without departing from the spirit of the invention and, we therefore do not desire to be limited to that precise form beyond the limitations of the accompanying claims.

We claim:

1. A gun cylinder closed at one end having a threaded hole through the closed end, an extension at the other end removably secured to and having substantially the same bore as the cylinder and terminating with a reduced nozzle, a cartridge seated in the bore of the cylinder and far enough in the cylinder extension to provide a hand hold for the withdrawal of the cartridge shell when the extension is removed, a plug in the bore of the cartridge initially in the end opposite the hand hold portion, said plug having a countersunk outer side, means to prevent the passing of the plug through said end opposite the hand hold portion and a threaded shaft screwed through the threaded hole in the end of the gun cylinder said shaft having a formed end which enters the countersink in the plug.

2. A gun cylinder closed at one end having a threaded hole through the closed end, a removable extension at the other end secured to the cylinder and terminating with a discharge nozzle, said end having a cartridge holding socket, a cartridge having an open lower end seated in the socket and inserted in the cylinder by its upper end with a sliding fit through the open end of the cylinder, said cartridge containing a viscid material, a plug in the bore of the cartridge initially in the top end thereof and having a central countersink on its outer side, said top end of the cartridge being reduced so the plug cannot pass therethrough and a threaded shaft screwed through the threaded hole in the end of the gun cylinder, said shaft having an end which is seated in the countersink in the plug.

3. A gun cylinder closed at one end having a threaded hole through the closed end, a removable extension at the other end secured to the cylinder and terminating with a discharge nozzle, said end having a cartridge holding socket, a cartridge having an open lower end seated in the socket and inserted in the cylinder by its upper end with a sliding fit through the open end of the cylinder, said cartridge adapted to contain a viscid material, a plug in the bore of the cartridge initially in the top end thereof, said top end of the cartridge being reduced so the plug cannot pass therethrough, a wad of compressible material contacting the inner face of the plug, and a threaded shaft screwed through the threaded hole in the end of the gun cylinder against the plug.

In testimony whereof we affix our signatures.

ROBERT M. BOWES.
CHARLES E. BOWES.